United States Patent [19]
Montroy et al.

[11] Patent Number: 5,788,352
[45] Date of Patent: Aug. 4, 1998

[54] MULTIPLEXED MULTI-IMAGE SOURCE DISPLAY WRITING SYSTEM

[75] Inventors: John T. Montroy, Carlsbad, Calif.; John P. Garcia, Tucson, Ariz.; Ronald S. Gold, Fullerton; Jerry E. Freeman, Irvine, both of Calif.

[73] Assignee: Hughes Aircraft Company, Los Angeles, Calif.

[21] Appl. No.: 331,237

[22] Filed: Oct. 25, 1994

[51] Int. Cl.$^6$ .................................................... G03B 21/14
[52] U.S. Cl. .......................... 353/30; 353/94; 359/750; 359/742
[58] Field of Search ......................... 353/30, 31, 94, 353/122; 359/115, 117; 348/750, 751, 753, 754, 793, 742; 345/88, 87, 99

[56] References Cited

U.S. PATENT DOCUMENTS

| | | | |
|---|---|---|---|
| 4,851,918 | 7/1989 | Crowley | 348/754 |
| 5,018,076 | 5/1991 | Johary et al. | 364/518 |
| 5,122,790 | 6/1992 | Yasuda et al. | 348/793 |
| 5,192,946 | 3/1993 | Thompson et al. | |
| 5,233,338 | 8/1993 | Surguy | 348/742 |
| 5,386,250 | 1/1995 | Guerinot | 348/755 |

*Primary Examiner*—William Dowling
*Attorney, Agent, or Firm*—M. E. Lachman; M. W. Sales; W. K. Denson-Low

[57] ABSTRACT

A projection system wherein two or more separate display sources, such as high brightness sources, or active matrix liquid crystal display (AMLCD) or other flat panel displays are used to write information directly onto a display screen, or onto a photoactivated reflective light valve for projection onto the display screen. Sequential imaging apparatus is used to alternately generate first and second images for display. For example, such images are coupled to the photoactivated reflective light valve and an illumination source is employed to illuminate the light valve and project a composite image onto the display screen. The flat panel displays may be transmissive, reflective, or self-emissive with the use of an optical shutter. A writing illumination source is used for non-self-emissive flat panel displays. Using high brightness display sources, the images may be directly written onto the display screen without the use of the reflective photoactivated light valve and the illumination source. In the present invention, each video frame is divided equally among the AMLCD/flat panel displays either spatially or temporally, and the flat panel displays are optomechanically multiplexed or optically shuttered by a multiplexer, thus imaging partial frames of information sequentially or completely onto the photoactivated light valve. This results in a complete frame or sequence of frames written onto the photoactivated light valve and displayed on the screen. The present invention reduces the data rate requirements on the image sources by a factor of two, four, or more. This is a significant advantage for super-definition projection systems with multi-megapixel count requirements. Blemish/defect mitigation is achieved by alternately writing to the flat panel displays using a ping-pong approach with one-to-one full resolution flat panel displays.

16 Claims, 5 Drawing Sheets

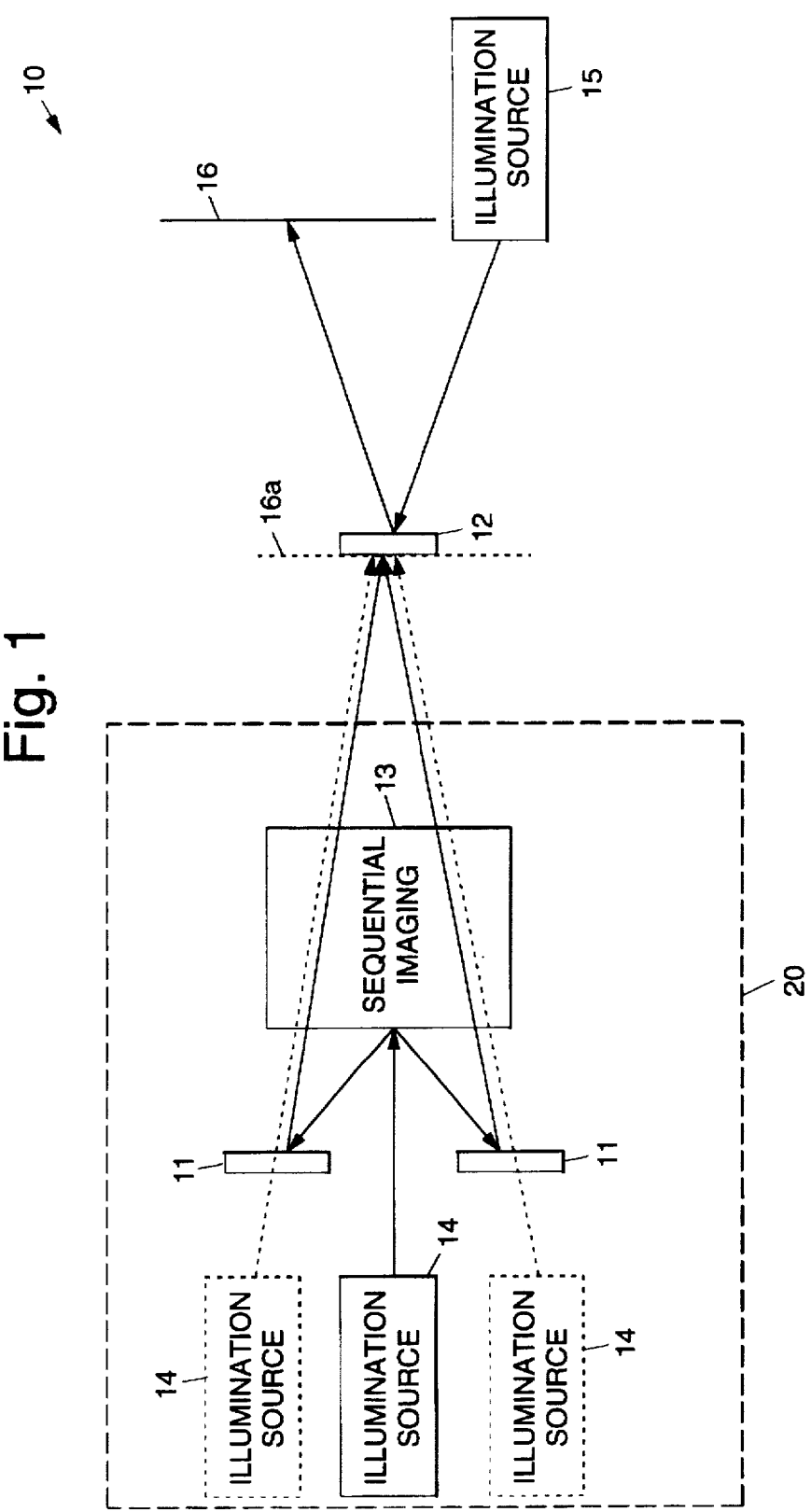

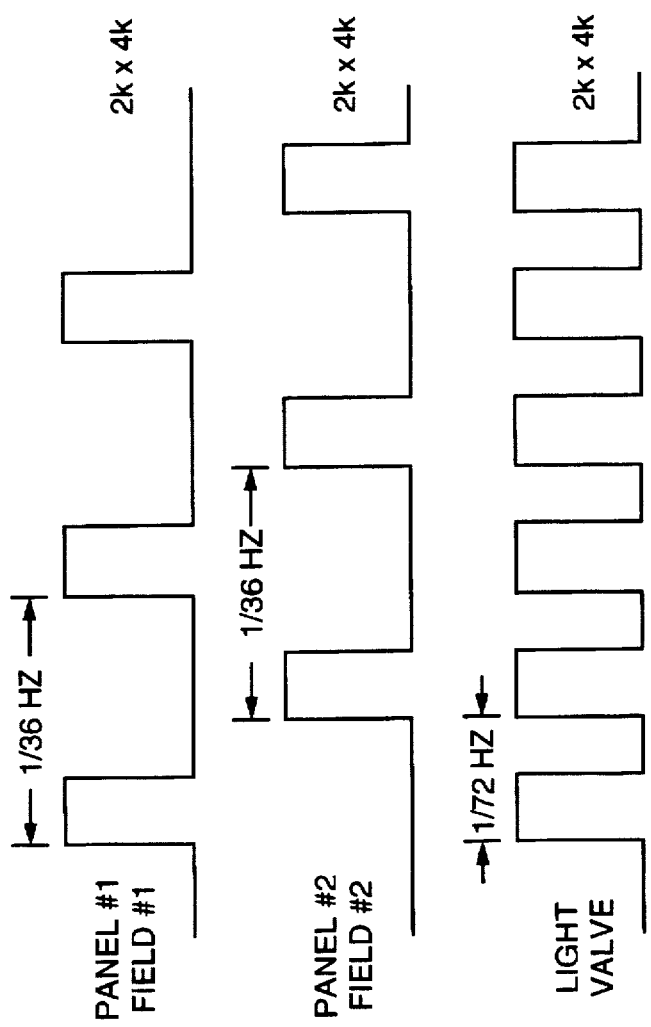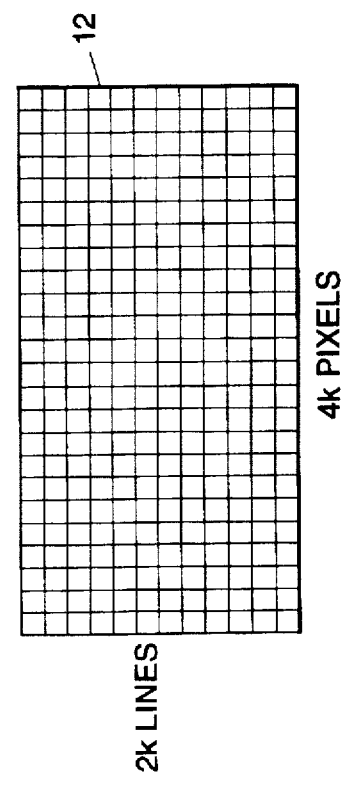
Fig. 3

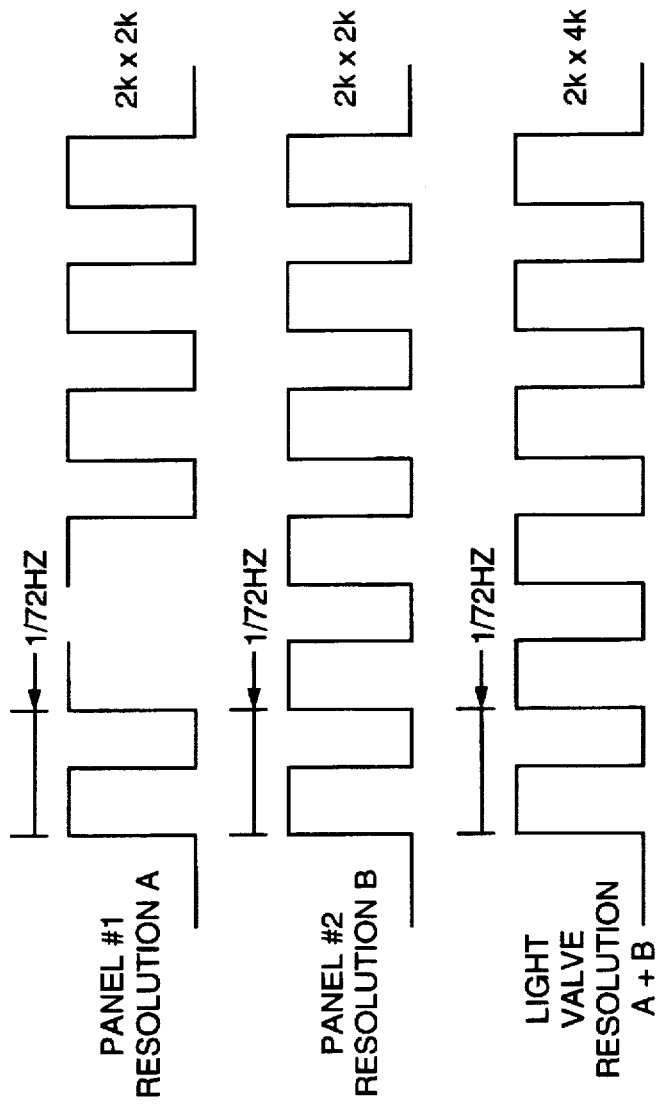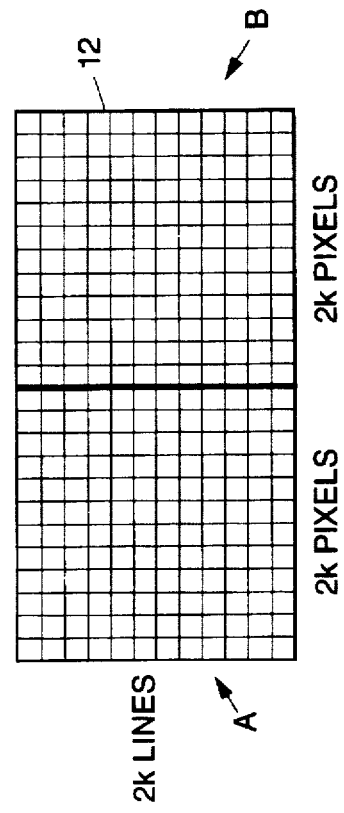
Fig. 5

MULTIPLEXED MULTI-IMAGE SOURCE DISPLAY WRITING SYSTEM

BACKGROUND

The present invention relates to image display systems, and more particularly, to multiplexed multi-panel display writing systems that provides for multiplexing between individual display sources to reduce system data rate requirements, or to increase overall display resolution.

In general, prior art relating to the present invention includes driving a reflective photoactivated light valve with a CRT (both fiber optic coupled and optically relayed), laser scan, and a single active matrix liquid crystal display (AMLCD) panel.

Methods of producing a complete frame or sequence of frames, at a reasonable data rate include (1) an alternating panel or ping-pong approach in which two panels of the required resolution are utilized, (2) an interleaved approach along one or both axes, and (3) a sequential tiling approach in which the frame is divided vertically, horizontally, or in a quad-type arrangement or configuration.

The disadvantages of the closest prior art (the single AMLCD panel) include: a two or more times higher data rate which the single panel must support such as are provided by methods (1), (2), and (3) above; a higher pixel count is required of the single panel/driving source such as are provided by methods (2) and and (3) above; and no redundancy of image sources exists with the single panel such as are provided by method (1) above.

Prior art relating to the present invention may also be found in the patents discussed below. The teachings of each of these patents disclose significant differences in structure and/or function compared with the present invention. The discussion below summarize these differences.

Japanese patent application number 4-259177 describes a liquid crystal projector having an optical system that uses projection light sources, reflectors, condenser lenses, liquid crystal panel units, projection lenses, and a screen. A signal of each line of a video signal in one frame is applied alternately to each liquid crystal unit, which is driven by the liquid crystal panel units. Simultaneously, the transmitted light from the liquid crystal panel units is synthesized with the projection lenses by moving parallel to the optical axis in the direction perpendicular to the optical axis of the incident light to each liquid crystal panel unit and the result is displayed on the screen. Thus, the number of picture elements requested to one liquid crystal panel is reduced, the yield at manufacture is improved and the cost is reduced. However, there is no multiplexing between liquid crystal panels to reduce the data rate requirements of the system. This invention simply uses multiple LC panels which simultaneously display imagery which is combined onto a single viewing screen.

U.S. Pat. No. 4,365,869 describes image projection and imaging apparatus that is very similar to most video wall displays. This apparatus comprises a lens system, a light shutter, pattern forming means for forming an image pattern on the light shutter, projection control means for projecting the image pattern formed on the light shutter onto a focus plane by the lens system, photoelectric conversion means for converting the object image into an electrical signal, and image control means for projecting the object image onto the photoelectric conversion means through the lens system and the light shutter. The uniqueness of this apparatus is the light guiding feature resulting from the lens plates and illuminating plate. This allows for a small throw distance and projector compactness. There is no multiplexing between individual LC panels to reduce the system data rate requirements.

U.S. Pat. No. 5,122,790 discloses a liquid crystal projector that includes first, second and third liquid crystal display panels, first, second and third LCD panel driving circuits, and a control circuit. The liquid crystal projector projects and displays pictures of the three liquid crystal display panels and superimposing them on a screen. Each driving circuit applies driving voltages based on display data to scanned liquid crystal portions in the corresponding liquid crystal display panel. The driving voltages are inverted in polarity for every horizontal scanning period and for every frame. Also, at least one of the panels receives driving voltages of opposite polarities with respect to the remaining two panels. This patent thus describes an approach for reducing flicker by driving three individual LCD panels with alternating non-inverted and inverted drive waveforms. All three panels display images at the same time and the projected image is the combination of the three individual images. There is no multiplexing between the individual LCD panels to reduce the system data rate requirements.

U.S. Pat. No. 5,085,506 teaches an image projection apparatus in which an image object plane contains a plurality of reflecting images and a light source and optical system projects a beam on each of the plurality of images. Spaced projection lenses are positioned to receive the light reflected from the images and direct the light on a projection surface with the plurality of reflected images in coregistration. This apparatus includes an LCD device (typically a non-real time, smectic LCD) that is partitioned into multiple image sources (e.g. four) which are illuminated simultaneously with multiple light beams (e.g. laser beams). Spaced projection lenses are then used to focus the reflected light from each LCD sub-panel onto the projection screen. No multiplexing between image sources takes place, and the multiple images are simultaneously generated and displayed on the viewing screen, which is generally not in real time.

U.S. Pat. No. 4,755,869 discloses a device for projecting an image on a large screen with a small projection distance, in which the image is formed by pieces on an assembly of liquid crystal cells for then projecting it onto a screen by means of an assembly of lenses associated with the liquid crystal cells. To illuminate the cells, a transparent plate is used forming a light guide and which comprises an assembly of networks associated with the cells to extract the light from the plate and project it onto the cells. More specifically, this device employs a rotating/switching mirror to alternately project light (from an LCD image source) onto a viewing screen and image light onto a photosensor. The rotating mirror allows rapid switching between the projection mode and the imaging mode. Multiple LCD image sources are not employed, nor is multiplexing (between LCD image sources) taking place for the purpose of reducing system data rate requirements.

U.S. Pat. No. 3,909,525 discloses an array of laterally-abutted Fresnel magnifying lenses used in combination with an aligned array of image generators having particular spaced-apart objective images derived from an original image, to display such objective images for viewing as a unitary magnified original image without noticeable overlap or distortion throughout an appreciable theater space. This patent describes a tiled display wherein the multiple image sources have abutted Fresnel lenses in front of them (to eliminate seams between the tiles) and is unrelated to the present invention.

U.S. Pat. No. 5,018,076 discloses a data processing system that includes a video controller and a flat panel display system. The flat panel display system includes first and second flat panel displays that appear as a single display. The video controller includes first and second address generators for generating first and second address information and a counter for counting vertical sync position to identify alternating first and second display frames. The controller outputs the first address information to drive the first display and the second address information to drive the second display during the first display frames. The controller outputs the second address information to drive the first display and the first address information to drive the second display during the second display frames. The displays are identical and the address generators are identical. The use of dual displays with dual, flip-flopping address generators is more advantageous than using a single address generator to drive two display panels. This patent thus discloses a video controller for driving multiple flat panel displays. Dual address generators are used to address dual flat panels. In successive frames the controller switches the address information between the panels. The essence of this invention is the realization of larger display sizes and/or pixel formats without having to develop additional controller and display hardware. There is no multiplexing between individual display panels for the purpose of reducing system data rate requirements.

U.S. Pat. No. 5,283,599 discloses an image combining and projecting apparatus having a plurality of light transmission type image panels through which light beams are transmitted, condenser lenses corresponding to the light transmission type image panels, a beam combining mechanism that combines beams transmitted through the image panel, and a projection lens through which beams are projected after being combined by the beam combining mechanism. The condenser lenses are provided on the light outgoing side of the corresponding image panels. The apparatus further has a condenser lens adjusting mechanism for adjusting the positions of the condenser lenses. This patent thus describes an optical system for combining red, green, blue images of an additive, full color projection system. Multiple panels/image sources are utilized for the sole purpose of generating separate red, green, blue images. This invention is generally unrelated to the present invention.

It is therefore an objective of the present invention to provide for an improved multiplexed multi-panel active matrix liquid crystal display writing system that provides for multiplexing between individual display sources to reduce system data rate requirements and/or to increase resolution of the projected display.

SUMMARY OF THE INVENTION

In order to meet the above and other objectives, the present invention comprises projection apparatus for providing an image on a display screen that has a predetermined high (display) image resolution. The projection apparatus comprises first and second display sources for generating first and second images having predetermined low image resolutions that when combined form a composite image having the predetermined high (display) image resolution. Sequential imaging means is provided for processing the first and second images derived from the first and second display sources to produce the composite image having the predetermined high (display) image resolution for display that is imaged onto the display screen. The apparatus may further comprise a reflective photoactivated light valve disposed between the sequential imaging means and the viewing screen for receiving the composite image produced by the sequential imaging means, and an illumination source for applying illumination light to the photoactivated reflective light valve to generate a reflected image having the predetermined high (display) image resolution on the display screen.

Thus, the present invention uses two or more display sources, such as flat panel displays, including active matrix liquid crystal displays (AMLCD), for example, to write information directly onto a display screen, or onto a reflective photoactivated light valve for projection onto the display screen. Using high brightness display sources, the images may be directly written onto the viewing screen without the use of the reflective photoactivated light valve and its illumination source. The present invention may utilize one of many types of possible flat panel or other image sources, to write onto a reflective photoactivated light valve. The flat panel displays may be transmissive, reflective, or self-emissive with shuttering. Alternatively, self-emissive displays such as CRT displays, for example, may be used. A novel aspect of the present invention is that each video frame is divided equally among the display sources (AMLCD/flat panel displays, for example) either spatially or temporally, and the displays are optomechanically multiplexed or optically shuttered, thus imaging the partial frames of information sequentially or simultaneously onto the photoactivated light valve, or directly on the viewing screen. This results in a complete frame or sequence of frames written onto the photoactivated light valve and displayed on the screen, or written directly on the viewing screen.

The present invention reduces the data rate requirements on AMLCD or flat panel display circuitry by a factor of two, four, or more. This is a significant advantage for super-definition projection systems with multi-megapixel count requirements such as are envisioned by Electronic Cinema's proposed eight million pixel display system (2 k×4 k). It is believed that the present invention may provide the only economically and technically feasible approach for generating an eight million pixel flicker-free, monochrome or full color, high brightness, large screen, projected display in real time. The present invention provides a solution to temper the data rate requirements which present a significant technical challenge for this eight million pixel projection display. Without data rate mitigation provided by the present invention, the capability of loading data into 2 k×4 k AMLCDs or other flat panel displays in the refresh time period required is beyond the state of the art, in that D to A (digital to analog) converter speed becomes a limiting parameter. The present invention significantly enhances the probability of success for this project.

An additional advantage of the present invention is built in redundancy of the image source (i.e., multiple panel displays). Also, blemish/defect mitigation is achieved by alternately writing to the flat panel displays (the ping-pong approach) in a one to one configuration (i.e. fall resolution flat panel displays). A major advantage and benefit is lower image source cost. Even though multiple panel displays are incorporated, the overall cost is reduced due to the increased yield inherent with the lower pixel density flat panel displays described with reference to methods (2) and (3) in the Background section.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates embodiments of a multiplexed multi-panel display writing system in accordance with the principles of the present invention;

FIG. 3 illustrates an illumination timing diagram and spatial diagram for a ping-pong approach for producing a complete frame or sequence of frames that may be used in the systems of FIGS. 1 and 2;

FIG. 5 illustrates an illumination timing diagram and spatial diagram for a sequential tiling approach for producing a complete frame or sequence of frames that may be used in the systems of FIGS. 1 and 2.

DETAILED DESCRIPTION

Figure 2A:
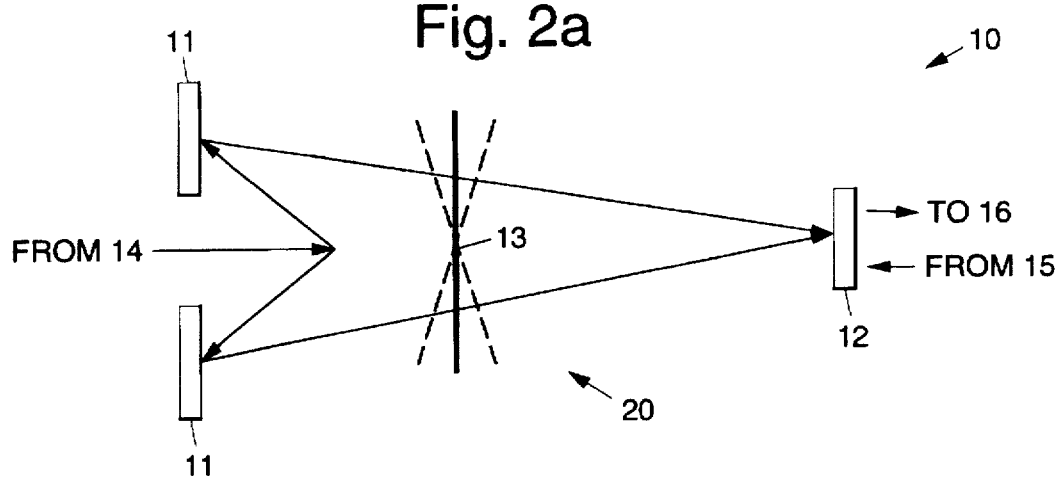
FIG. 2a, 2b, and 2c illustrate top, side and end views, respectively, of an embodiment of a multiplexed multi-panel display writing system in accordance with the principles of the present invention.

Next generation display applications, such as for air traffic control, medical imaging, advanced workstations, large screen digital maps, and electronic cinema, will require addressable resolutions of several million pixels or more. The resolution requirements of electronic cinema are particularly demanding, wherein 4 k×2 k=8 million full color pixels are required for 35 mm film equivalency. In addition to the demanding resolution requirements, electronic cinema and other applications will require large display areas. Thus, projection systems based on high resolution reflective light valves and high resolution, matrix addressed image sources represent the most promising approach for meeting these requirements. Because it is one of the most difficult display applications (in terms of display size, luminous output and resolution), electronic cinema is the display application discussed herein. However, the invention described herein is applicable to numerous other high resolution display applications.

Very high resolution matrix addressed flat panel displays are the most viable image source technology for the electronic cinema application. Three such image sources for the projected display illumination energy (i.e., photoactivated light valves) are required for color, red, green, and blue. A refresh rate between 48 Hz (current theater projector refresh rate) and 72 Hz (small theater/projection room projector refresh rate) is required, depending on the achievable luminance. To load 8 million pixels in $\frac{1}{48}$ Hz or in $\frac{1}{72}$ Hz requires a data rate of 48 Hz×8 million=384 MHz or 72 Hz×8 million=576 MHz, respectively. The latter rate is two orders of magnitude greater than the speed capability of embedded D to A converters. It is necessary to electrically tile a number of blocks of pixels and to load these individual blocks in parallel as a means to reduce the data rate. The exact pixel count will be 4096×2048=8.39 million. To reduce the data rate from 576 MHz to approximately 5 MHz (current embedded D to A converter performance limit) necessitates loading 128 blocks in parallel (each block=32× 16 pixels). However, with this many pixel blocks the panel I/O (input/output) is impractical: 128 blocks×8 bits per pixel=1024 lines. This many data lines to a miniature display device is not realizable. The device complexity is greatly increased and severe display performance degradation occurs with this many data lines simultaneously switching at a very high rate. In addition, an approach for temperature compensation between D to A converters is required.

The present invention provides a solution to the data rate and/or I/O problem described above. If it is assumed that the practical limit on panel I/O is 256 lines (plus approximately 15 I/O lines for the clock and special clock, data, and address lines for DC offset of the D to A converters for temperature compensation), then 256/8=32 blocks of pixels can be loaded in parallel. This maps into a data rate requirement of 12 MHz for the 48 Hz image refresh rate case and 18 MHz for the 72 Hz image refresh rate case. The present invention provides for three different approaches, all of which employ multiple image sources and either an optomechanical multiplexing or optical shuttering technique, which sufficiently reduces the matrix-addressed flat panel display data rate requirement, for example, such that 5 MHz D to A converters can be utilized and an 8 million pixel projection display is realizable.

Table I below is a data rate requirement matrix for different configurations and options associated with certain embodiments of the present invention. Table II below is a data rate requirement matrix for the specific 4 k×2 k electronic cinema application. In Table I, the columns correspond to four different projector configurations involving 1, 2, 4, and 8 flat panel display image sources, respectively. Corresponding to each of these configurations, the headings N, N/2, N/4, and N/8 refer to the total number of pixels contained in the individual flat panel displays, where N is the number of pixels in the projected display. The row headings 1, 2, 3, and 4 refer to four different cases of flat panel display refresh rate (normalized to the refresh rate of the projected image). The data rate requirement is reduced as more flat panel displays are used in the multiplexing scheme. Similarly, the data rate requirement is reduced by refreshing each panel at a lower rate, while maintaining an apparent projected image refresh rate which is high enough to avoid flicker.

TABLE I

Data Rate Requirement Matrix
(Data rates normalized to 100%)

| Number of Flat Panels | Individual Flat Panel Refresh Rate/ Projected Image Refresh Rate | Number of Pixels Per Individual Flat Panel | | | |
|---|---|---|---|---|---|
| | | N | N/2 | N/4 | N/8 |
| 1 | 1 | 100 | 50 | 25 | 12.5 |
| 2 | 0.50 | 50 | 25 | 12.5 | 6.25 |
| 3 | 0.33 | 33 | 16.7 | 8.3 | 4.17 |
| 4 | 0.25 | 25 | 12.5 | 6.25 | 3.13 |

TABLE II

Data Rate Requirement Matrix
For 4k × 2k Electronic Cinema Application

| Individual Panel Refresh Rate | Number of Pixels per Individual Flat Panel | | | |
|---|---|---|---|---|
| | 4k × 2k | 2k × 2k | 2k × 1k | 1k × 1k |
| 72 Hz | 18 MHz | 9 MHz | 4.5 MHz | 2.3 MHz |
| 36 Hz | 9 MHz | 4.5 MHz | 2.3 MHz | 1.1 MHz |
| 24 Hz | 6 MHz | 3 MHz | 1.5 MHz | 0.75 MHz |
| 18 Hz | 4.5 MHz | 2.3 MHz | 1.1 MHz | 0.56 MHz |

Table II assumes that 32 blocks are electronically tiled, and that the projected image refresh rate is 72 Hz.

Referring now to the drawing figures, they illustrate several configurations of multiplexed multi-panel display writing systems 10 in accordance with the principles of the present invention, along with temporal diagrams illustrating various approaches for producing a complete frame or sequence of frames, at a reasonable data rate. Such approaches include (1) an alternating panel or ping-pong approach in which a plurality of display sources, such as flat panel displays, of the required resolution are utilized, (2) an interleaved approach along one or two axes, and (3) a sequential tiling approach in which the frame is divided vertically, horizontally, or in a quad-type configuration.

Referring to FIG. 1, the multiplexed multi-panel display writing system 10 comprises two or more separate display sources 11, which may be flat panel displays 11, such as AMLCD flat panel displays 11, for example, that are reflective, transmissive, or self-emissive, to address (write on), in a sequential manner, one or more reflective photo-activated light valves 12 for projection. The dashed box 20 represents imaging display apparatus 20 for alternately generating first and second images for display. Such images are coupled to a reflective photoactivated light valve 12 and an illumination source 15 is employed to illuminate the light valve 12 and project a composite image onto a display screen 16. Alternatively, self-emissive displays such as CRT displays 11 may be used in place of the flat panel displays 11.

For transmissive and reflective flat panel displays 11, an illumination source 14 is used to provide writing light that is imaged onto each of the flat panel displays 11 by means of a sequential imaging device 13 such as a multiplexer 13 or a shutter mechanism 13 for alternately providing writing light to the displays 11. The images provided by the flat panel displays 11 are optomechanically multiplexed, or optically shuttered by the multiplexer 13 such that the images are sequentially written onto the photoactivated light valve 12. The system 10 may utilize a single illumination source 14 or multiple illumination sources 14 to expose the flat panel displays 11 if they are not self-emissive. The illumination source 15 is employed to illuminate the reflective photoactivated light valve(s) 12 to project the composite image onto the display screen 16. When using self-emissive displays 11, the shutter mechanism 13, or multiplexer 13, alternately permits light to be transmitted to the reflective photoactivated light valve 12. The present system 10 minimizes data rate requirements, utilizing current state of the art components, such that real time video can be realized for super high resolution (2,000 lines×4,000 pixels) projection systems based on the reflective photoactivated light valve 12.

In one specific embodiment of the system 10, the flat panel displays 11 have identical pixel formats and display identical information. An example of a configuration incorporating two full resolution flat panel displays 11 is illustrated in FIG. 1. The illumination writing light source 14 may be a laser, cathode ray tube, or filtered broadband halogen, xenon, or incandescent source, for example. The light is directed to the multiplexer 13, such as may be provided by an electro-optical multiplexer, a galvanometer mounted mirror, or a rotating polygon, for example. Alternatively, two separate light sources 14 (dashed boxes) may be used with multiplexer 13 comprising the shutter mechanism 13 (optical, mechanical, etc.) in each channel to alternately illuminate each flat panel display 11. If the flat panel displays 11 are self-emissive or transmissive, optical shutter(s) 13 may be employed to alternately expose the photoactivated light valve 12. As one flat panel display 11 writes to the photoactivated light valve 12, the other flat panel display 11 is loaded with data and the alternating sequence progresses frame by frame in a ping-pong fashion. This writing light provided by the illumination sources 14 (dashed) for use with transmissive flat panel displays 11 is illustrated by the dashed lines in FIG. 1. The dashed lines to the right of the flat panel displays 11 also illustrates the images provided by the self-emissive flat panel displays 11.

An illumination timing diagram is presented in FIG. 3 to illustrate the ping-pong approach. The effective refresh rate of the projected display is high enough to avoid flicker (e.g. 60 Hz for TV; 72 Hz for the electronic cinema device, etc.). However, each individual AMLCD or flat panel display 11 needs to be updated at only one-half, one-quarter, etc., of the effective refresh rate. Hence, the data rate and speed requirements for each AMLCD or flat panel display are mitigated by a factor of 2, 4, etc. An additional advantage of this approach is the redundancy built in from the utilization of dual panel displays of the same resolution/pixel density count, and displaying the same resolution.

Figure 2B:
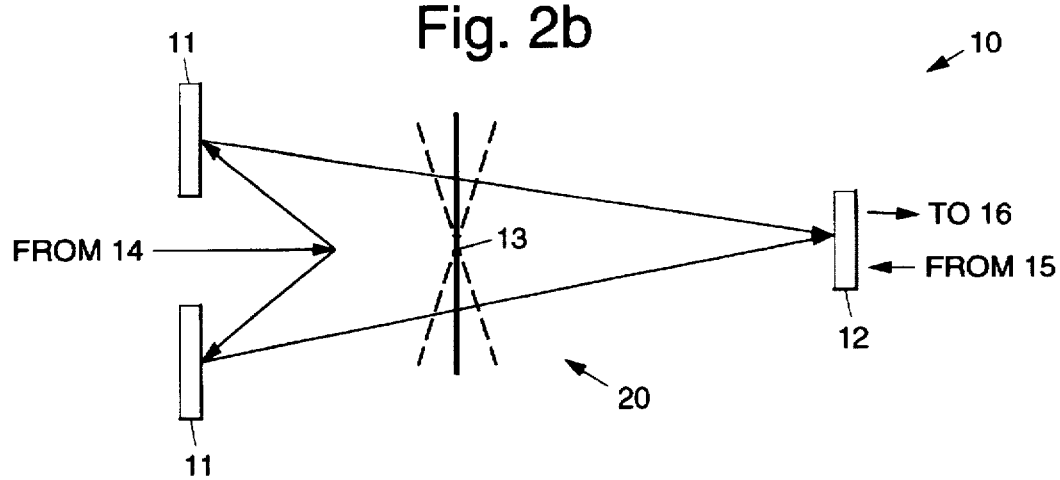
Figure 2C:
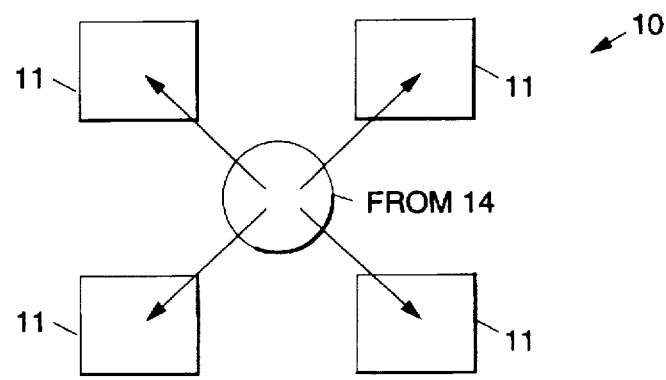
Figure 4:
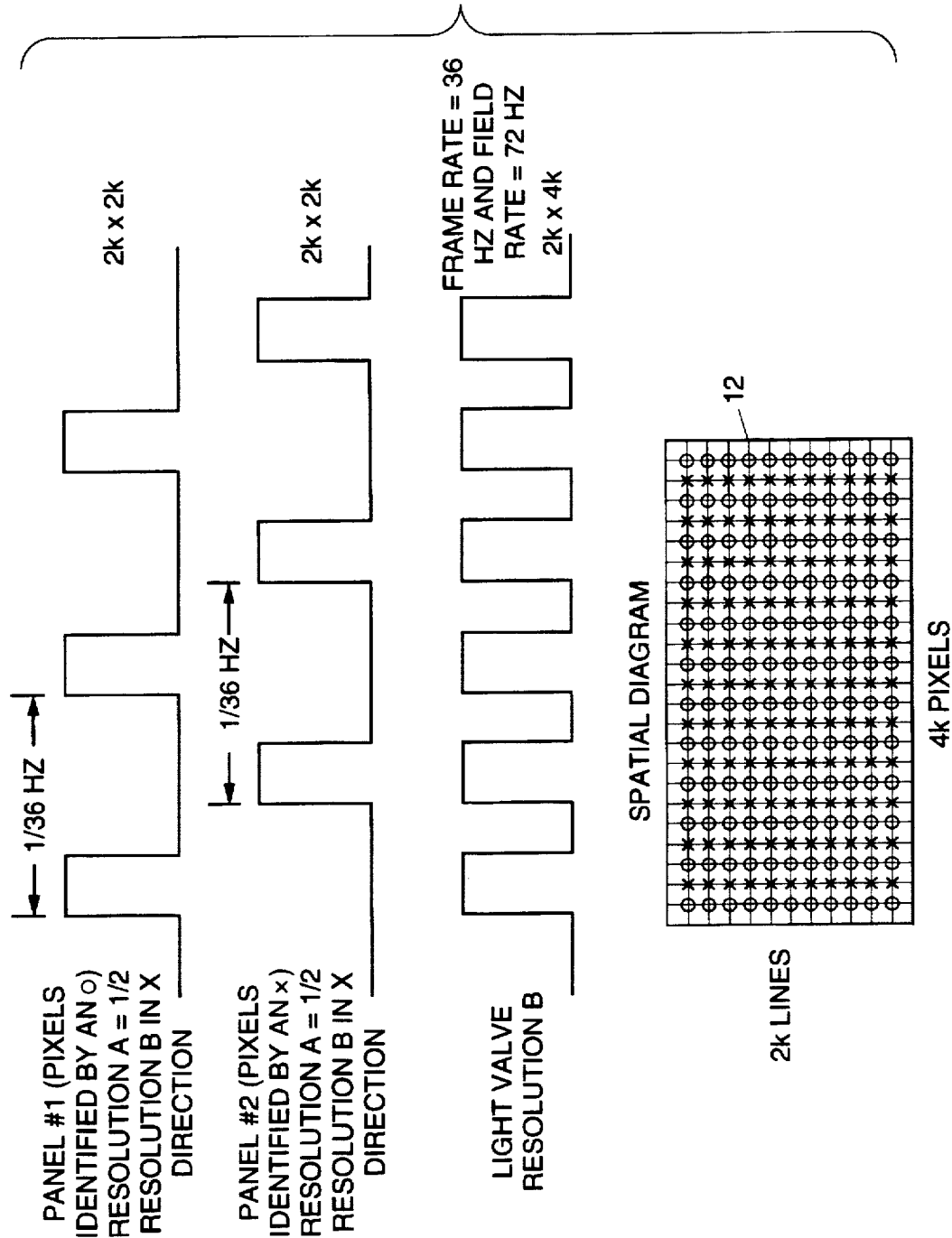
FIG. 4 illustrates an illumination timing diagram and spatial diagram for an interleaving approach for producing a complete frame or sequence of frames that may be used in the systems of FIGS. 1 and 2.

FIG. 2a, 2b, and 2c illustrate top, side and end views, respectively, of an embodiment of the system 10 wherein each of 2, 4, etc., AMLCD, or other flat panel displays 11 have identical, but lower (than the previously discussed approach) pixel formats, or where the flat panel displays 11 have identical resolution. Again, the images from the flat panel displays 11 are optomechanically multiplexed by the multiplexer 13 such that the images are sequentially written, while they are interleaved onto the photoactivated light valve 12. In this case, a higher pixel format is achieved by interleaving the individual AMLCD or flat panel images. The optomechanical multiplexing provided by the multiplexer 13 allows for 2:1, 4:1 interlacing in the time domain which again mitigates the data rate/speed requirements for each flat panel display 11. For example, in a two panel configuration, each AMLCD flat panel display 11 may operate at 36 Hz to yield an equivalent 72 Hz refresh rate (2:1 interlaced). It is possible to operate each AMLCD flat panel display 11 at 18 Hz in a four panel configuration to yield an equivalent 72 Hz refresh rate (4:1 interlaced). With this approach the data rate and speed requirements of the AMLCD flat panel display 11 are reduced due to the lower update rate and due to the reduced number of pixels in an individual AMLCD flat panel display 11. Also, for most applications, it is much easier to fabricate (at high yield and lower cost) an AMLCD flat panel display 11 which has one-half, one-quarter, etc., the number of pixels. However, consideration of flicker at these other frequencies must be addressed. An illumination timing diagram is presented in FIG. 4 to illustrate the interleaved approach implemented in this embodiment of the system 10.

Another embodiment of the system 10 uses the same basic optomechanical multiplexer 13 to sequentially write partial frames of data generated by each AMLCD, or flat panel display 11 onto the photoactivated light valve 12. In this case, the information from each flat panel display 11 is spatially tiled together rather than being interleaved. The advantage of the spatially tiling approach is that the precise registration required for the interleaving approach is eliminated. Potential disadvantages of the spatially tiling approach include (1) a "seam" issue associated with tiled flat panel displays 11, and (2) a greater propensity for perceived flicker. However, the multiplexer 13 is used to ping-pong between two, four, or more panel displays 11 such that the projected image is displayed in a pseudo raster scan fashion. An illumination timing diagram is presented in FIG. 5 to illustrate the spatially tiling approach implemented in this embodiment of the system 10. Utilizing this tiling approach with a two stage projection configuration minimizes any seam artifacts by using the photo-activated light valve's low pass characteristics to mask those same artifacts.

Referring again to FIG. 1, another embodiment of the present invention may be implemented using high brightness display sources 11. Using such high brightness display sources 11, their images may be directly written onto the display screen 16a without the need for the reflective photoactivated light valve 12 and its illumination source 15. This system 10 is illustrated in FIG. 1 using the dashed display screen 16a located at the position of the light valve 12. The display sources 11, and sequential imaging device 13 (multiplexer 13 or shutter mechanism 13) are employed to directly project the images onto the display screen 16a using the above-described techniques.

Thus there has been described new and improved multiplexed multi-panel display writing systems that provide for multiplexing between individual display sources to reduce system data rate requirements and/or to increase resolution of the projected display. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen further comprising:

a reflective photoactivated light valve disposed between the sequential imaging means and the display screen for receiving the composite image produced by the sequential imaging means; and an illumination source for applying illumination light to the photoactivated reflective light valve to generate a reflected image having the predetermined display image resolution on the display screen.

2. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen wherein the display sources comprise:

flat panel displays for generating at least the first and second images; and an illumination source for providing writing light;

and wherein the sequential imaging means sequentially images the writing light onto each of the flat panel displays.

3. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen wherein the display sources comprise:

flat panel displays for generating at least the first and second images; and an illumination source for providing writing light;

and wherein the sequential imaging means sequentially images the writing light onto each of the flat panel displays wherein the first and second flat panel displays have the same image resolution and wherein the sequential imaging means alternately images the writing light onto each of the flat panel displays.

4. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen wherein the display sources comprise:

flat panel displays for generating at least the first and second images; and an illumination source for providing writing light;

and wherein the sequential imaging means sequentially images the writing light onto each of the flat panel displays wherein the first and second flat panel displays have predetermined low image resolutions and wherein the sequential imaging means alternately images the writing light onto each of the flat panel displays to create an interleaved image along a selected axis.

5. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen wherein the display sources comprise:

flat panel displays for generating at least the first and second images; and an illumination source for providing writing light;

and wherein the sequential imaging means sequentially images the writing light onto each of the flat panel displays wherein the first and second flat panel displays have frames that are divided along a selected axis and wherein the sequential imaging means generates a tiled image.

6. The apparatus of claim 1 wherein the sequential imaging means comprise a multiplexer.

7. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen wherein the sequential imaging means comprises an optical shutter.

8. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen wherein the display sources comprise:

flat panel displays for generating at least the first and second images; and an illumination source for providing writing light;

and wherein the sequential imaging means sequentially images the writing light onto each of the flat panel displays and wherein the first and second flat panel displays further comprise transmissive flat panel displays.

9. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen wherein the display sources comprise:

flat panel displays for generating at least the first and second images; and an illumination source for providing writing light;

and wherein the sequential imaging means sequentially images the writing light onto each of the flat panel displays and wherein the first and second flat panel displays comprise reflective flat panel displays.

10. Projection display apparatus for providing an image on a display screen that has a predetermined display image resolution, said apparatus comprising:

first and second non-identical display sources for generating at least first and second images having predetermined image resolutions that when combined form a composite image having the predetermined display image resolution; and sequential imaging means for the opto-mechanical or electro-optical processing of the images derived from the display sources to produce the composite image having the predetermined display image resolution for display that is imaged onto the display screen wherein the display sources comprise:

flat panel displays for generating at least the first and second images; and an illumination source for providing writing light;

and wherein the sequential imaging means sequentially images the writing light onto each of the flat panel displays and wherein the first and second flat panel displays comprise self-emissive flat panel displays.

11. Projection apparatus for providing an image on a display screen that has a predetermined display image resolution, said apparatus comprising:

first and second display sources for generating first and second images having predetermined image resolutions that when combined form a composite image having the predetermined display image resolution;

sequential imaging means for processing the first and second images derived from the first and second display sources to produce the composite image having the predetermined display image resolution for display that is imaged onto the display screen;

a reflective photoactivated light valve disposed between the sequential imaging means and the display screen for receiving the composite image produced by the sequential imaging means; and an illumination source for applying illumination light to the photoactivated reflective light valve to generate a reflected image having the predetermined display image resolution on the display screen.

12. The apparatus of claim 11 wherein the sequential imaging means comprises an opto-mechanical multiplexer for sequentially writing the first and second images provided by the flat panel display onto the photoactivated light valve.

13. The apparatus of claim 12 wherein the sequential imaging means comprises an optical shutter for sequentially writing the first and second images provided by the flat panel displays onto the photoactivated light valve.

14. The apparatus of claim 11 wherein the first and second flat panel displays have the same low image resolution and wherein sequential imaging means alternately images the writing light onto each of the flat panel displays.

15. The apparatus of claim 11 wherein the first and second flat panel displays have predetermined low image resolutions and wherein the sequential imaging means alternately images the writing light onto each of the flat panel displays to create an interleaved image on the photoactived reflective light valve along a selected axis.

16. The apparatus of claim 11 wherein the first and second flat panel displays have frames that are divided along a selected axis and wherein the sequential imaging means writes the first and second images onto photoactivated reflective light valve to create a tiled image on the photoactivated reflective light valve.

* * * * *